US012379180B1

(12) United States Patent
Kempf et al.

(10) Patent No.: US 12,379,180 B1
(45) Date of Patent: Aug. 5, 2025

(54) CROSSBOW WITH DE-COCKING CRANK MECHANISM HAVING SPROCKETS

(71) Applicants: James J. Kempf, Coralville, IA (US); David A. Barnett, Tarpon Springs, FL (US)

(72) Inventors: James J. Kempf, Coralville, IA (US); David A. Barnett, Tarpon Springs, FL (US)

(73) Assignee: BARNETT OUTDOORS, LLC., Tarpon Springs, FL (US)

( * ) Notice: Subject to any disclaimer, the term of this patent is extended or adjusted under 35 U.S.C. 154(b) by 166 days.

(21) Appl. No.: 18/236,967

(22) Filed: Aug. 23, 2023

Related U.S. Application Data

(60) Provisional application No. 63/406,028, filed on Sep. 13, 2022.

(51) Int. Cl.
*F41B 5/14* (2006.01)
*F41B 5/12* (2006.01)
*B66D 1/06* (2006.01)

(52) U.S. Cl.
CPC .............. *F41B 5/12* (2013.01); *F41B 5/1469* (2013.01); *B66D 1/06* (2013.01)

(58) Field of Classification Search
CPC ............. F41B 5/12; F41B 5/1469; B66D 1/06
USPC ............................................................ 124/86
See application file for complete search history.

(56) References Cited

U.S. PATENT DOCUMENTS

| | | | | |
|---|---|---|---|---|
| 6,631,886 B1 * | 10/2003 | Caudle | B66D 1/00 254/338 |
| 8,375,928 B1 * | 2/2013 | Bednar | F41B 5/1469 124/25 |
| 10,421,637 B1 * | 9/2019 | Huang | F41B 5/123 |
| 11,067,357 B1 * | 7/2021 | Chu | F41B 5/1449 |
| 11,156,429 B1 * | 10/2021 | Kempf | F41B 5/12 |
| 11,221,191 B2 | 1/2022 | Bednar et al. | |
| 2021/0348875 A1 * | 11/2021 | Bednar | F41B 5/12 |
| 2023/0266096 A1 * | 8/2023 | Bednar | F41B 5/12 124/25 |

FOREIGN PATENT DOCUMENTS

| | | | | |
|---|---|---|---|---|
| CA | 2086579 | * | 6/1994 | B66D 1/06 |

* cited by examiner

*Primary Examiner* — John E Simms, Jr.
(74) *Attorney, Agent, or Firm* — Donald J. Ersler

(57) ABSTRACT

A crossbow with a de-cocking crank mechanism having sprockets preferably includes a cranking mechanism, which utilizes a clutch sprocket and clutch assembly axial to a drive gear, and a one-way bearing axial to a bearing sprocket to cock a crossbow. The clutch assembly includes a clutch sprocket, a flywheel surface, a friction disc, and a pressure plate. The use of a one-way bearing may control the rotation of the drive unit used to wind (take-up) an elongated connecting device. Functional properties of a crank mechanism for the winding and unwinding of the elongated connecting device such as a rope, chord or the like device for pulling a secondary object from a first position to a second position are well known in the art.

3 Claims, 9 Drawing Sheets

CROSSBOW WITH DE-COCKING CRANK MECHANISM HAVING SPROCKETS

BACKGROUND OF THE INVENTION

1. Cross-References to Related Applications

This is a non-provisional patent application which claims the benefit of provisional patent application No. 63/406,028, filed on Sep. 13, 2022.

2. Field of the Invention

The present invention relates to crossbows. A cocking mechanism which utilizes a de-cocking mechanism for ease of use. The present invention also uses a clutch sprocket and a bearing sprocket with a one way bearing to prevent rotation of a cocking handle and spool. The clutch sprocket and the bearing sprocket are coupled by a chain or belt.

3. Discussion of the Prior Art

Cranking devices typically use a ratchet mechanism to lock tension on a line, string or rope. More recently the use of a clutch and a one-way bearing on a direct-drive cocking mechanism was introduced on an AXE 400 crossbow. This device allowed for the silent cocking and de-cocking of a crossbow by the user, however due to this device being direct drive, it was very difficult for the user to cock the crossbow. As the stored energy increased in the limbs, it was increasingly difficult to wind the cranking mechanism. To de-cock other crossbows, it was often a hit-or-miss proposition, in that if the handle slipped out of the user's hand, the handle would either hit the users hand causing severe injury, or just barely miss the user's hand, causing damage to the crossbow. Patent no. 10421637 to Huang discloses a cranking mechanism, which teaches multiple clutch plates axial to a crank shaft, however a complex procedure in assembly and use have been known to complicate the operation of the cocking device during the de-cocking procedure. Huang requires a manual de-coupling of the one-way bearing, removal of the crank handle, and loosening of a star drag wheel in order to de-cock the crossbow.

U.S. Pat. No. 11,221,191 to Bednar et al. discloses a crossbow with winch, which teaches a cocking and de-cocking winch for a crossbow having three-axis of rotation, and a plate gear and a brake gear, both having teeth, and the teeth interact with each other. Bednar also teaches a one-way bearing fixed with the brake gear.

It appears that the prior art does not teach or suggest a cranking mechanism which utilizes a clutch assembly axial to a sprocket and a one-way bearing axial to a sprocket of a crossbow cocking mechanism to prevent uncontrolled unwinding of the spool when de-cocking or when the crank handle slips out of the user's hand. In addition to sprockets allowing for greater design flexibility, the use of sprockets and belts or chains spreads the dynamic load of the power transmission as opposed to gears. Gears generally have only one tooth at a time engaged from one gear to the next, wherein sprockets and belts or chains typically have at least forty percent of the perimeter of the sprockets engaged with the belt or chain.

Accordingly, there is a clearly felt need in the art for a crossbow having cranking mechanism which utilizes a clutch assembly axial to a clutch sprocket, and a one-way bearing axial to a bearing sprocket for use as a braking mechanism, coupled with a spool, for a controlled cocking and de-cocking of a crossbow.

There are many advantages of this type of innovations, such as reduction in costs, ease of assembly, and use.

SUMMARY OF THE INVENTION

The present invention relates to crossbows, and for the disclosure, the term "crossbow" shall include any device that is shouldered and propels an arrow. This shall include, but is not limited to, devices that are powered by limbs, springs, air, pneumatics etc, may or may not include cams, and may or may not include a bowstring. If having limbs, the lambs may face any direction, if having cams, the cams may be of any type known in the art. The term "crossbow" shell also includes the characteristics of having a mechanism that selectively retains and selectively releases a bowstring. The term "string carrier" is a component or assembly that is engaged to a bowstring and selectively retained with the bowstring, for the movement of the bowstring from an un-cocked to a cocked position, selectively retained or released in the cocked position, and returned to the uncocked position. The string carrier may transfer the bowstring from the carrier to another component for retainment of the bowstring while in the cocked position.

The present invention provides a crossbow having a cranking mechanism which utilizes a clutch sprocket and a clutch assembly axial to a drive gear and a one-way bearing axial to a bearing sprocket to cock a crossbow. The clutch assembly includes a clutch sprocket, a flywheel surface, a friction disc, and a pressure plate. The use of a one-way bearing may control the rotation of the drive unit used to wind (take-up) an elongated connecting device. In its simplest form, a friction plate is axial to a drive shaft, and is adjacent the flywheel surface of the clutch sprocket and the pressure plate. Functional properties of a crank mechanism for the winding and unwinding of the elongated connecting device such as a rope, chord or the like device for pulling a secondary object from a first position to a second position are well known. For a preferred embodiment of disclosed embodiment, we will disclose based on the following:

A crossbow cocking device has a support structure. A driven gear is axially coupled to a spool, both having a first axis of rotation. The driven gear may be integrated with the spool or coupled to the spool. A drive gear is axially to a drive shaft and coupled with a clutch assembly including a clutch sprocket, all having a second axis of rotation. A one-way bearing is radially fixed in a one-way bearing sprocket, and axially retained by the one-way bearing sprocket. When the clutch is seized, the one-way bearing allows the drive gear to rotate in a first direction winding an elongated member about the spool, but not rotate in a second direction. The one-way bearing sprocket and the clutch sprocket are functionally coupled by a belt or chain.

The drive assembly preferably includes a drive shaft, a drive gear, a pressure plate, a friction plate, a flywheel surface, a clutch sprocket, a compression collar, and a compression nut. The drive gear may be integrated with the drive shaft. The drive gear, pressure plate, friction plate, flywheel surface, clutch sprocket, compression collar, and compression nut are axial to the drive shaft. The clutch sprocket may have a flywheel surface adjacent the friction plate, performing the duties of a flywheel.

The driven assembly includes a spool winding surface, a spool, an elongated connecting component, and at least one spool gear. The spool gear may be integrated with the spool.

A first end of the elongated connecting component is functionally retained by the spool, and wraps and unwraps about the spool winding surface. A second end of the elongated connecting component is functionally coupled to a bowstring carrier. The bowstring carrier is selectably coupled and de-coupled with the bowstring.

When the clutch sprocket is radially coupled with the drive gear, the drive gear may rotate in the first direction.

When the clutch sprocket is radially de-coupled from the drive gear, the drive gear may rotate in the second direction and in the first direction. The drive gear is selectively rotatable about the second axis in a first drive gear direction for cocking the crossbow, and in a second drive gear direction, opposite the first drive gear direction for de-cocking the crossbow. The pressure plate is axial to and operably coupled with the drive gear, rotating about the second axis in unison with the drive gear. The friction plate is axially retained on the second axis, and adjacent the pressure plate. The clutch sprocket is axial to the drive gear shaft, and may have a flywheel surface. The flywheel surface is adjacent the friction plate. The clutch sprocket is selectively engageable with the drive gear; and selectively rotatable about the second axis. The drive gear operatively engages with the spool gear and the spool.

The one-way bearing axial to the third axis and axially coupled to the one-way bearing sprocket. The one-way bearing sprocket and clutch sprocket are operably coupled by a belt or chain. The use of sprockets and a belt or chain greatly increase design flexibility, assembly options, and reduced weight of the assembly. In addition to sprockets allowing for greater design flexibility, the use of sprockets and belts or chains spreads the dynamic load of the power transmission as opposed to gears. Gears generally have only one tooth at a time engaged from one gear to the next, wherein sprockets and belts or chains typically have at least forty percent of the perimeter of the sprockets engaged with the belt or chain. Functionally, sprockets and a belt or chain is also more reliable than gears, in that if a tooth on a gear is broken, the gears set will not turn. If foreign material enters the assembly, the gears are much more likely to seize than sprockets and a belt or chain.

When the clutch sprocket is operatively engaged with the drive gear, the drive gear can only be rotated about the second axis in the first drive gear direction, this direction is for winding the elongated connecting member and cocking the crossbow. When the clutch sprocket is disengaged from the friction plate and flywheel, it is not operatively engaged with the drive gear, and the drive gear can optionally be rotated about the second axis in either the first drive gear direction or the second drive gear direction without rotation of the clutch sprocket and the one-way bearing sprocket.

In use, the crank handle is rotated in the second direction just enough to de-couple the clutch assembly from the drive shaft. The string carrier is moved forward to engage the bowstring. The crank handle is rotated in the first direction, tightening the pressure locking nut causes the compression collar, clutch sprocket flywheel surface, friction plate, and pressure plate to come closer together. Clamping forces of the clutch sprocket, flywheel surface, friction disc, and pressure plate force the clutch assembly to “seize,” causing rotation of the drive gear in the first direction, which in turn causes rotation of the spool gear, rotating the spool in a winding direction, rotation of the clutch sprocket transmitting rotational forces through the belt or chain to the one-way bearing sprocket. The one way bearing allows rotation of the drive unit in the first direction.

As the user is cocking the crossbow, the elongated connecting component winds about the spool surface, moving the string carrier from an un-cocked position of the crossbow to a cocked position of the crossbow. At any time during the cocking procedure the user may cease rotation of the crank handle. Stored energy conveyed to the bowstring of the crossbow biases the elongated connecting component to pay out, or pull away from the spool. The drive unit biases the drive shaft and clutch assembly to the lock direction of the one-way bearing and pressure locking nut, such that when the crank handle is not rotated, the stored energy forces the drive unit in the direction of pay-out, the clutch assembly remains seized, the one-way bearing locks and the elongated connecting device will not pay out.

The stored energy of the crossbow is translated to the bowstring to bias the drive shaft and clutch assembly to the lock direction of the one-way bearing and pressure locking nut. When the user initiates the de-cocking of the crossbow, the crank handle is rotated in the second drive direction. As the crank handle is rotated in the second drive direction, the pressure nut releases some of the clamping forces of the clutch assembly to allow a controlled and limited rotation of the drive gear in the second drive direction, allowing the spool to payout the elongated connecting component. As soon as the crank handle is not rotated, the stored energy forces the drive unit in the direction of pay-out, the clutch assembly again seizes and the elongated connecting device will not pay out.

The trigger lever is pivotally retained with the crossbow stock, wherein the trigger arm is coupled to a connecting arm which is coupled to a sear. The trigger lever may be spring loaded to a return position, to bias the trigger lever in a first or second direction. The connecting arm may be spring loaded to bias the connecting arm in a first or second direction. In a preferred embodiment, the connecting arm may be selectable for length, to change the length of pull. Alternately, the connecting arm may be of differing lengths, and the user chooses a desired length of connecting arm for the chosen length of pull, such as a telescoping handle. Length of pull is the distance from the shoulder-engaging portion of the butt stock and the trigger lever.

The spool may be integrated with the spool gear or coupled with the spool gear. The spool may be supported by a shaft, a shaft and bearings or bushings, or by bearings or bushings. The crossbow cocking assembly may be integrated with the crossbow, or retained in a housing that may be removed from the crossbow.

Accordingly, it is an object of the present invention to provide a crossbow with a de-cocking crank mechanism having sprockets, with a clutch assembly axial to a clutch sprocket, and a one-way bearing axial to a bearing sprocket for use as a braking mechanism, coupled with a spool for controlled cocking and de-cocking of a crossbow.

mechanism of with a one-way bearing in accordance with the present invention.

Figure 9:
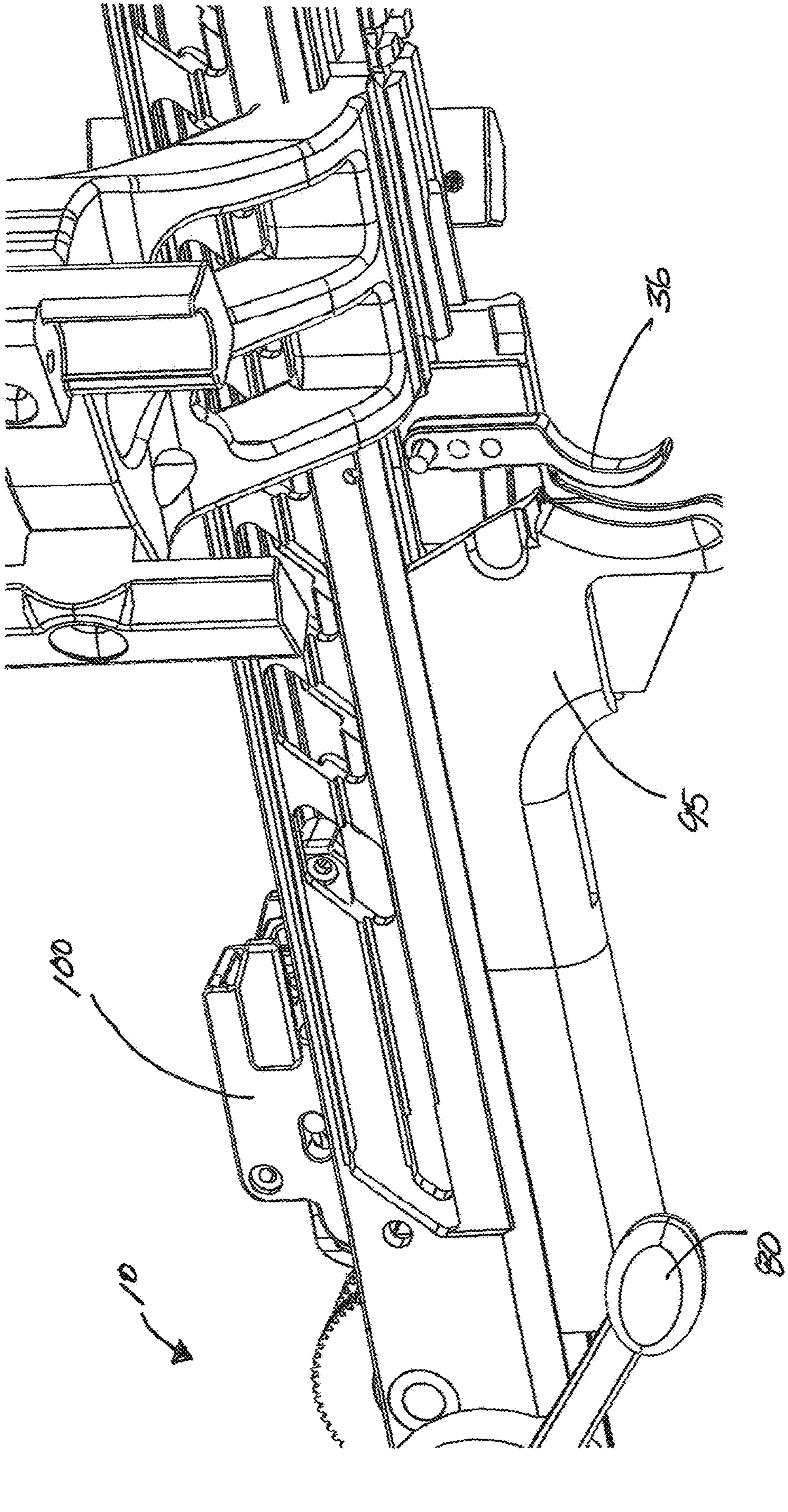

FIG. 9 is a partial perspective view of a crossbow frame and stock in accordance with the present invention.

DETAILED DESCRIPTION OF THE PREFERRED EMBODIMENTS

Figure 8:
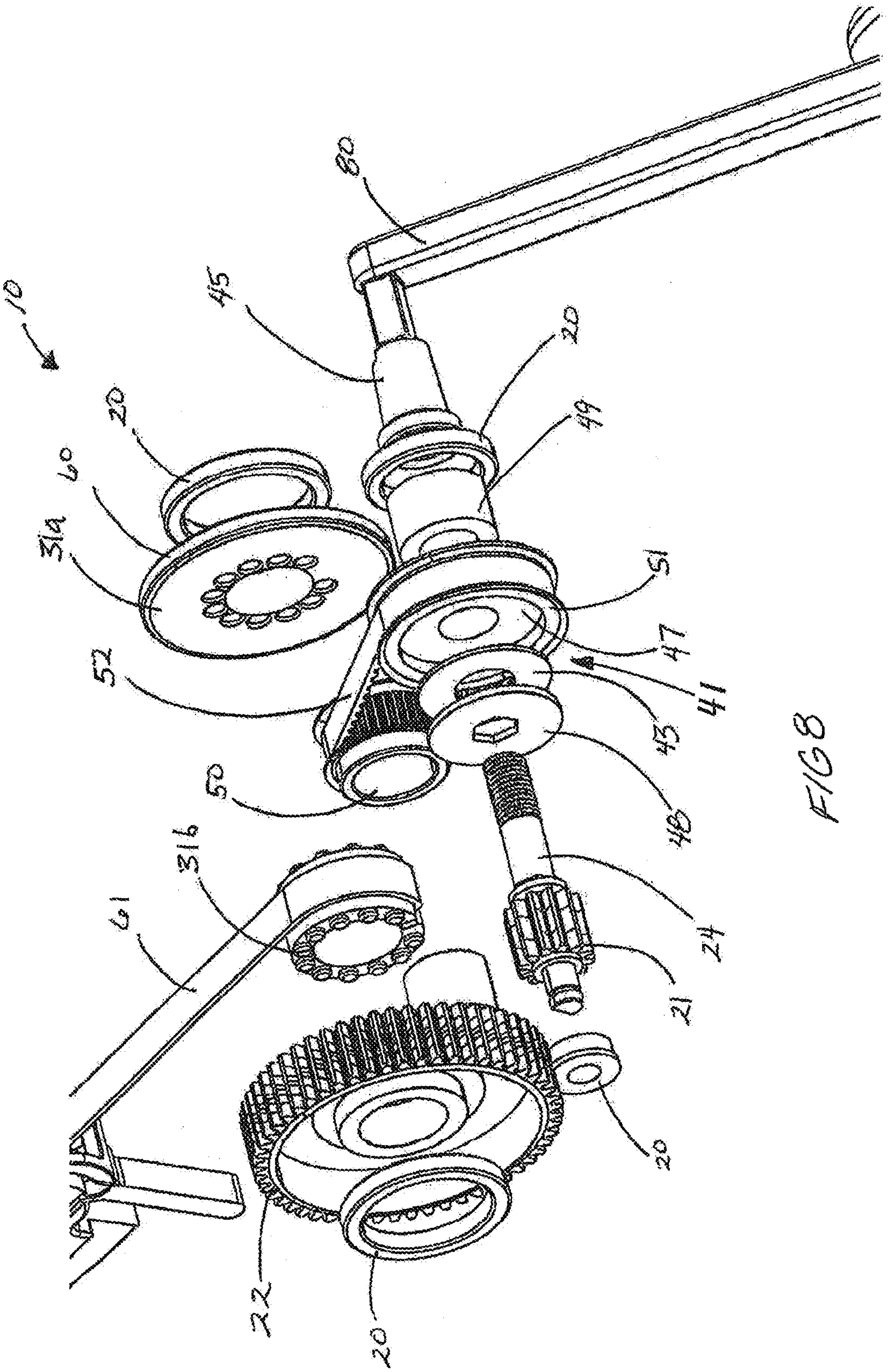
FIG. 8 is an exploded perspective view of a cranking mechanism in accordance with the present invention.

With reference to FIGS. 1-8, the present invention provides a crossbow having a cranking mechanism 10, which utilizes a bearing 20, a drive gear 21, a spool gear 22, a spool 31, a one-way bearing clutch sprocket 51, a clutch assembly 41 and a one-way bearing sprocket 50. The clutch assembly 41 is axial to the drive gear 21. The one-way bearing 44 is axial to the one-way bearing sprocket 50 for cocking a crossbow. The spool 31 preferably includes a first spool side surface 31*a*, a spool center 31*b*, a second spool side surface 31*c*, a spool winding surface 31*d* and a spool carrier 60. FIG. 8 is an exploded view of a preferred embodiment, wherein the clutch assembly 41 includes a clutch sprocket 51, a flywheel surface 47, a friction disc 43, and a pressure plate 48. The use of a one-way bearing 44 may control the rotation of the drive unit used to wind (take-up) an elongated connecting component 61. In its simplest form, a friction disc 43 is axial to a drive shaft 24, and is adjacent the flywheel surface 47 of the clutch sprocket 51 and the pressure plate 48.

Figure 1:
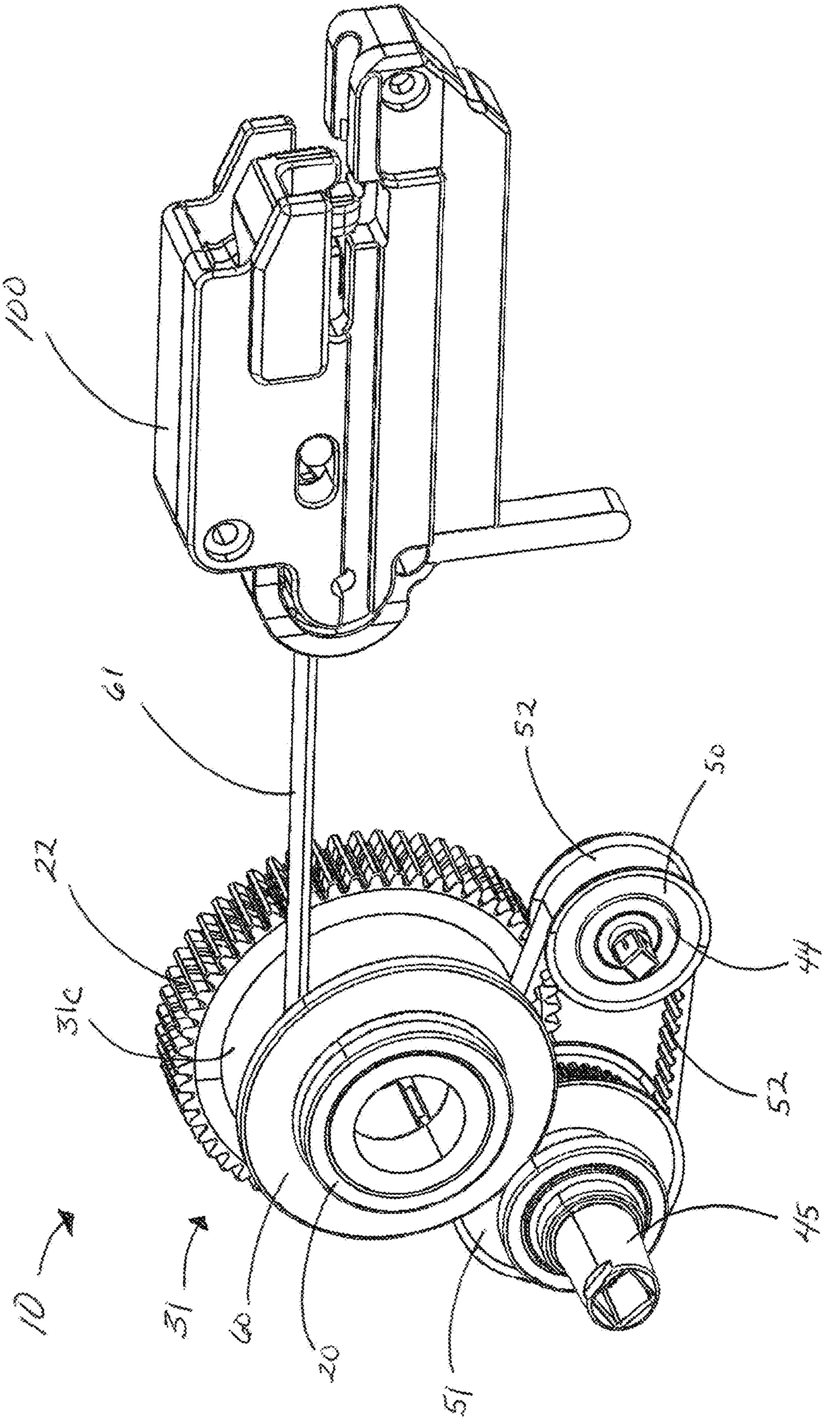
FIG. 1 is a right-side perspective view of a cranking mechanism in accordance with the present invention.
Figure 2:
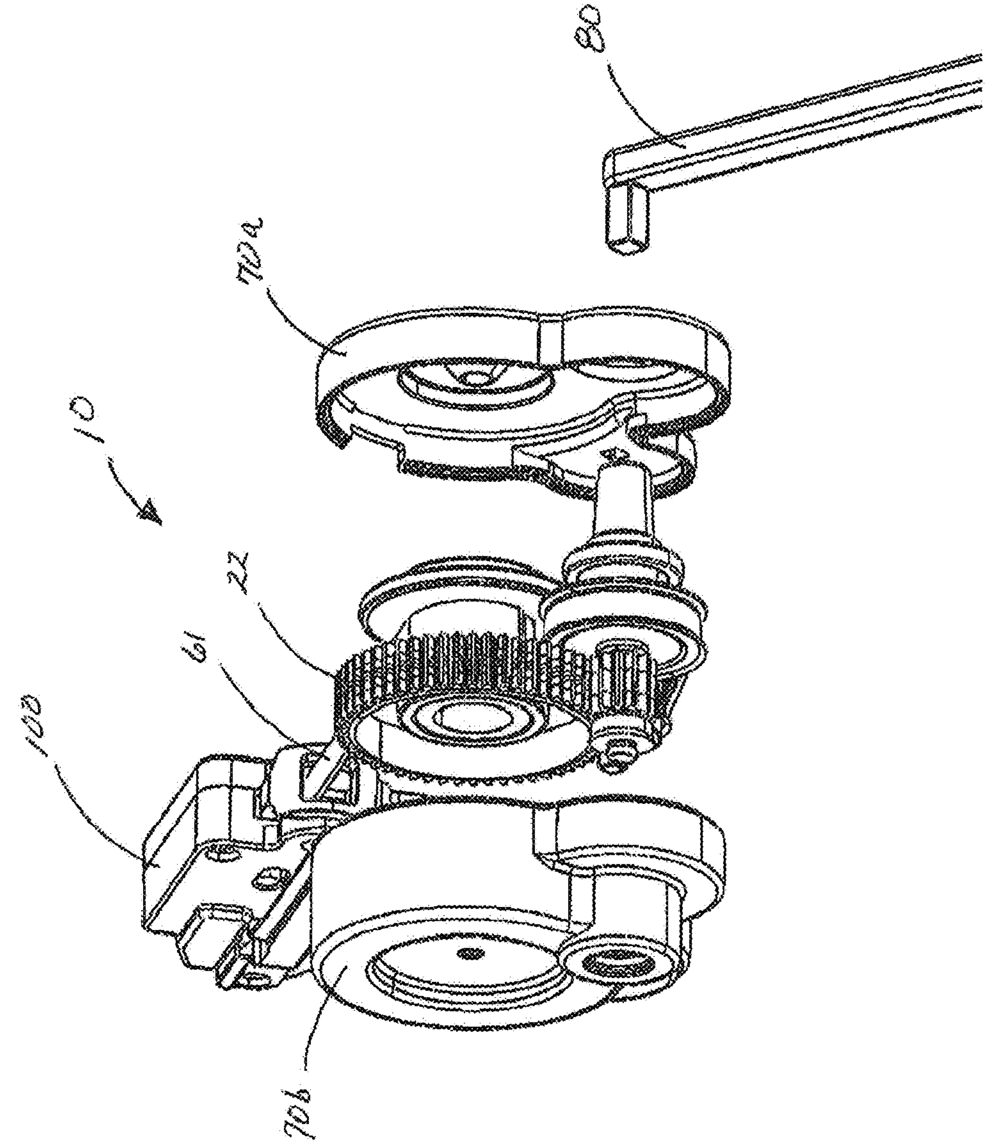
FIG. 2 is a partial rear exploded perspective view of a cranking mechanism in accordance with the present invention.

Functional properties of a crank mechanism for the winding and unwinding of the elongated connecting component such as a rope, chord or the like device for pulling a secondary object from a first position to a second position are well known. A preferred embodiment of the invention is disclosed as follows:

The crossbow cocking device 10 preferably has a support structure 70*a* and 70*b* as shown in FIG. 2. A driven gear 22 is coupled to a spool 31, both having a first axis of rotation. The driven spool gear 22 may be integrated with the spool 31 or coupled to the spool 31. A drive gear 21 is axial to a drive shaft 24 and coupled with the clutch assembly including a clutch sprocket 51, all having a second axis of rotation. A one-way bearing 44 is radially fixed in a one-way bearing sprocket 50, and axially retained by the one-way bearing sprocket 50. When the clutch assembly is seized, the one-way bearing 44 allows the drive gear 21 to rotate in a first direction, winding an elongated connecting device 61 about the spool 31, but not rotating in a second direction. The one-way bearing sprocket 50 and the clutch sprocket 51 are functionally coupled by a timing belt 52 or chain.

The drive assembly preferably includes the drive shaft 24, the drive gear 21, a pressure plate 48, a friction disc 43, a flywheel surface 47, a compression sprocket 49, a clutch sprocket 51, and a compression nut 45. The drive gear 21 may be integrated with the drive shaft 24. The drive gear 21, pressure plate 48, friction disc 43, flywheel surface 47, clutch sprocket 51, and compression nut 45 are axial on the drive shaft. The clutch sprocket 51 may have the flywheel surface 47 adjacent the friction disc 43, performing the duties of a flywheel.

Figure 3:
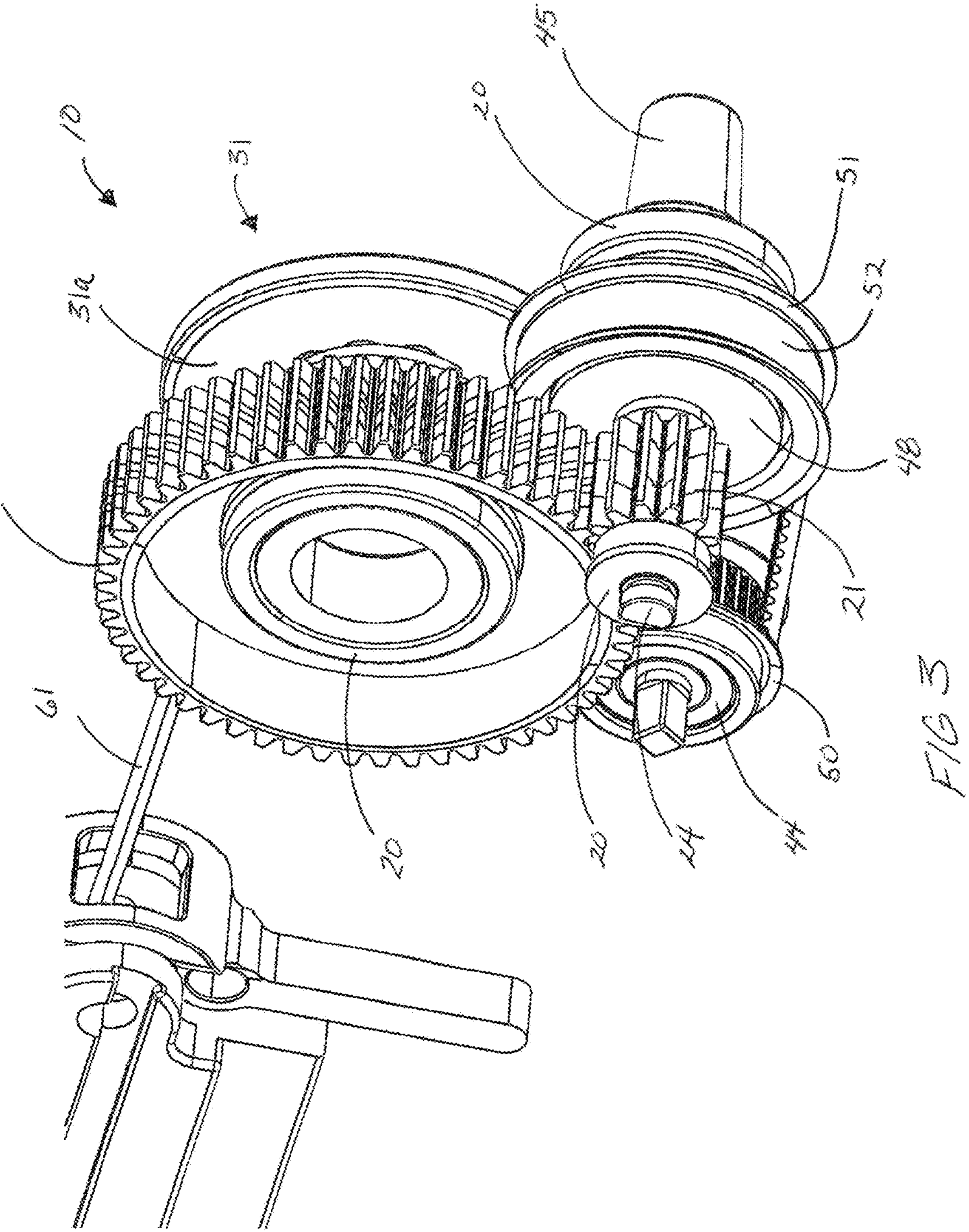
FIG. 3 is a partial rear perspective view of a cranking mechanism in accordance with the present invention.
Figure 4:
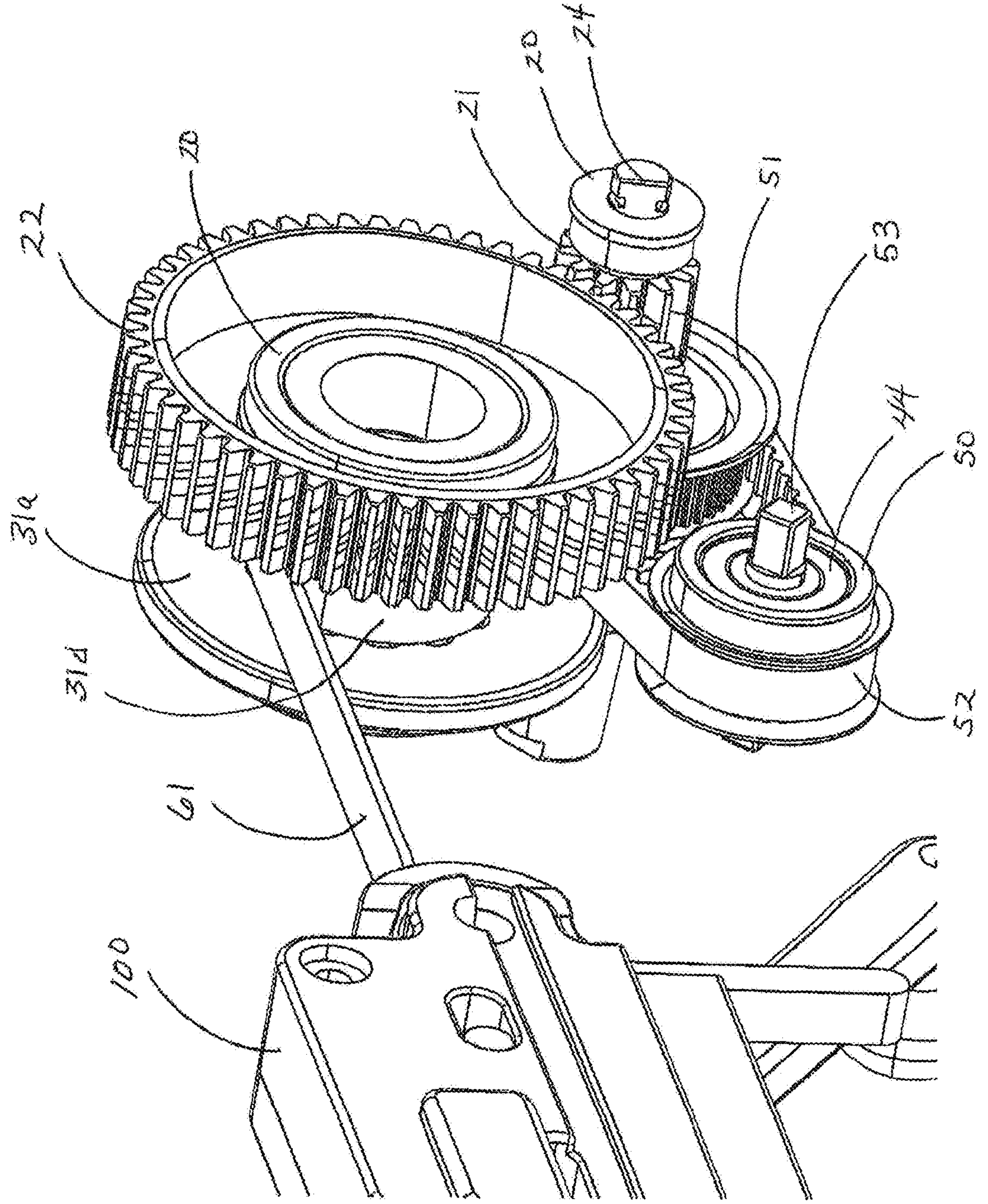
FIG. 4 is a partial rear perspective view of a cranking mechanism in accordance with the present invention.
Figure 5:
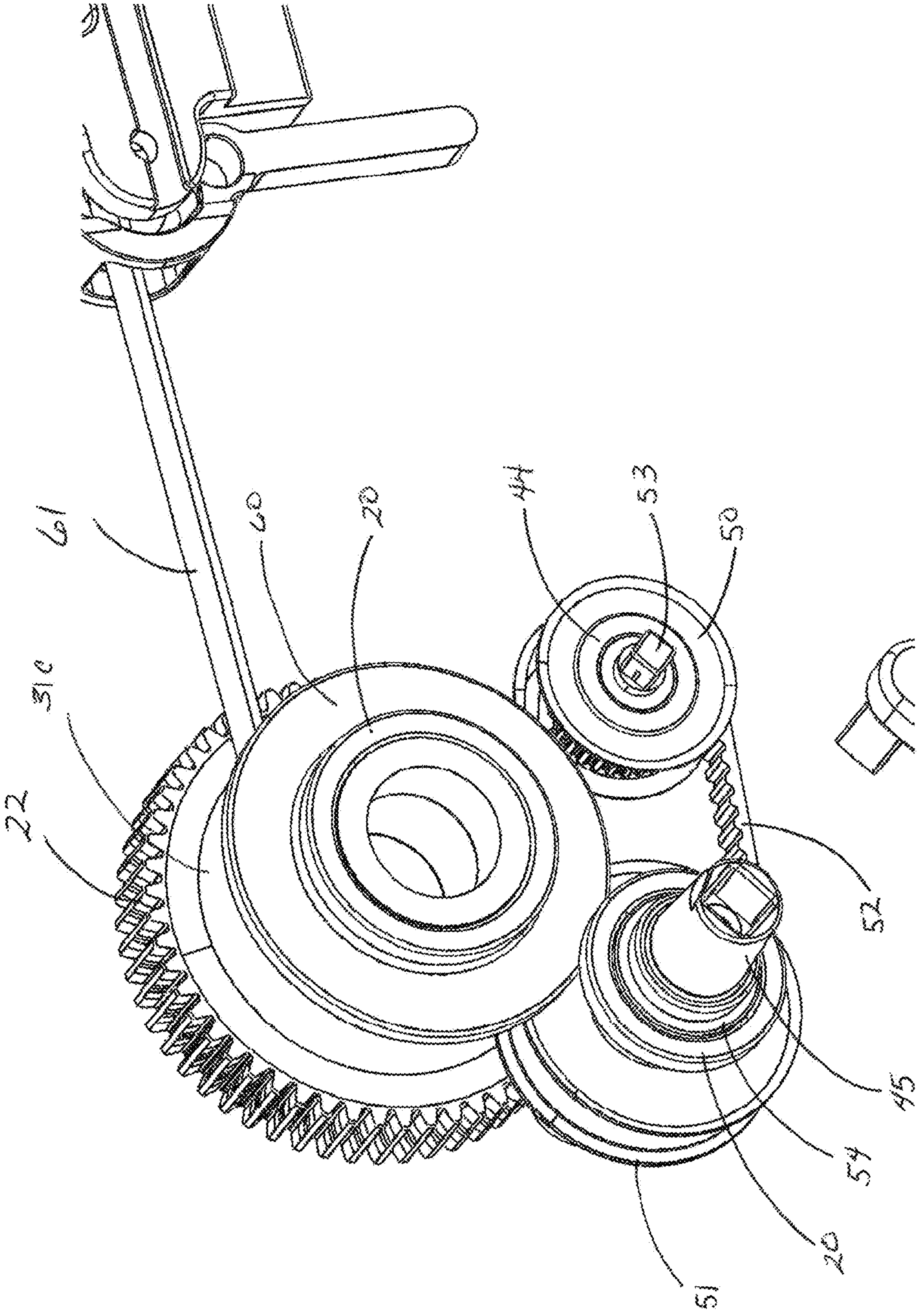
FIG. 5 is a partial rear perspective view of a cranking mechanism in accordance with the present invention.
Figure 6:
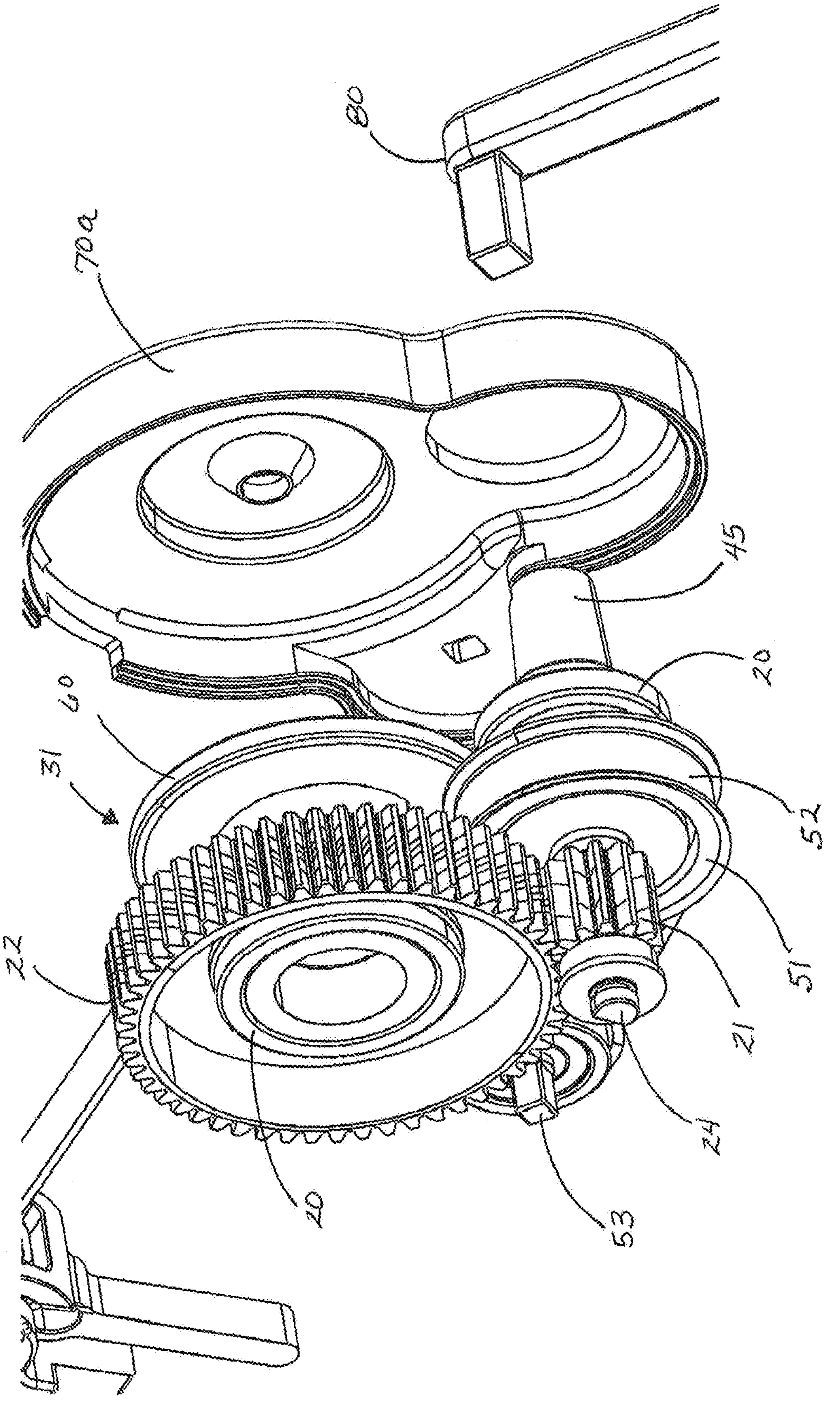
FIG. 6 is a partial rear exploded perspective view of a cranking mechanism in accordance with the present invention.
Figure 7:
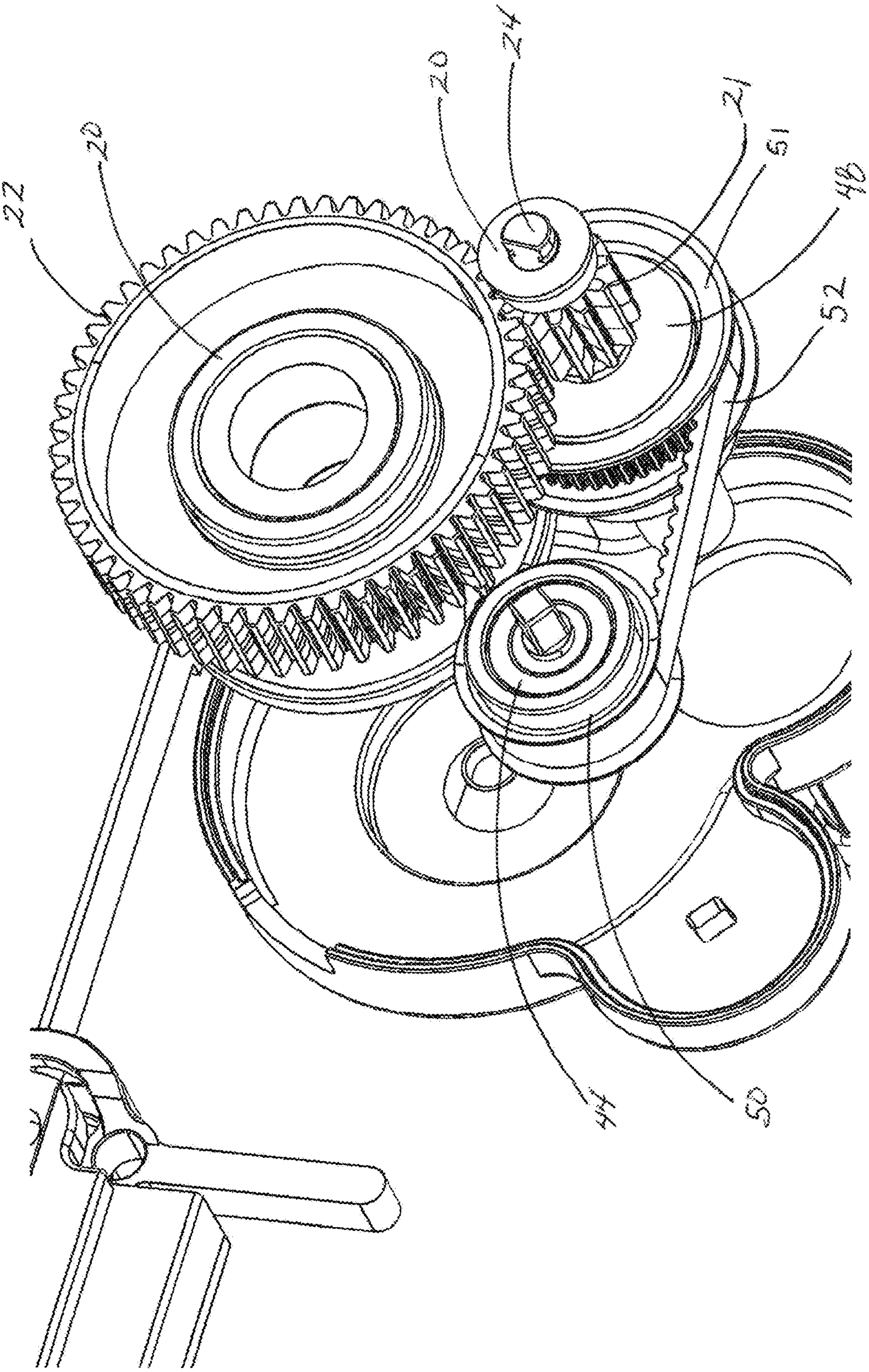
FIG. 7 is a partial rear perspective view of a cranking mechanism in accordance with the present invention.

With reference to FIGS. 3-4, the driven assembly preferably includes the spool winding surface 31*d*, the spool 31, an elongated connecting component 61, and at least one driven spool gear 22. The driven spool gear 22 may be integrated with the spool 31. A first end of the elongated connecting component 61 is functionally retained by the spool 31, and winds and unwinds about the spool winding surface 31*d*. A second end of the elongated connecting component 61 is functionally coupled to a bowstring carrier 100. The bowstring carrier 100 is selectively coupled and de-coupled with the bowstring.

When the clutch sprocket 51 is radially coupled with the drive gear 21, the drive gear 21 may rotate in the first direction.

When the clutch sprocket 51 is radially de-coupled from the drive gear 21, the drive gear 21 may rotate in the second direction and the first direction. The drive gear 21 is selectively rotatable about the second axis in a first drive gear direction for cocking the crossbow, and in a second drive gear direction, opposite the first drive gear direction, for de-cocking the crossbow. The pressure plate 48 is axial to and operably coupled with the drive gear 21, rotating about the second axis in unison with the drive gear 21. The friction disc 43 is axially retained on the second axis, and adjacent the pressure plate 48. The clutch sprocket 51 is axial to the drive shaft 24, and may have a flywheel surface 47. The flywheel surface 47 is adjacent the friction disc 43. The clutch sprocket 51 is selectively engageable with the drive gear 21; and selectively rotatable about the second axis. The drive gear 21 operatively engages with the driven spool gear 22 and the spool 31.

The one-way bearing 44 is axial with the third axis and axially coupled to the one-way bearing sprocket 50. The one-way bearing sprocket 50 and the clutch sprocket 51 are operably coupled by a timing belt 52 or chain. The use of sprockets and a belt or chain greatly increase design flexibility, assembly options, and reduced weight of the assembly. In addition to sprockets allowing for greater design flexibility, the use of sprockets and belts or chains spreads the dynamic load of the power transmission as opposed to gears. Gears generally have only one tooth at a time engaged from one gear to the next, wherein sprockets and belts or chains typically have at least forty percent of the perimeter of the sprockets engaged with the belt or chain. Functionally, sprockets and a belt or chain is also more reliable than gears, in that if a tooth on a gear is broken, the gears set will not turn. If foreign material enters the assembly, the gears are much more likely to seize than sprockets and a belt or chain.

When the clutch sprocket 51 is operatively engaged with the drive gear 21, the drive gear 21 can only be rotated about the second axis in the first drive gear direction, this direction is for winding the elongated connecting component 61 and cocking the crossbow. When the clutch sprocket 51 is disengaged from the friction disc 43 and flywheel (surface) 47, it is not operatively engaged with the drive gear 21, and the drive gear 21 can optionally be rotated about the second axis in either the first drive gear direction or the second drive gear direction without rotation of the clutch sprocket 51 and the one-way bearing sprocket 50.

In use, the crank handle 80 is actively engaged with the compression nut 45 and is rotated in the second direction, just enough to de-couple the clutch assembly from the drive shaft 24. The string carrier 100 is moved forward to engage the bowstring. The crank handle 80 is rotated in the first direction, tightening the compression nut 45 to cause on the compression nut collar 54, flywheel surface 47 of the clutch sprocket 51, friction disk 43, and pressure plate 48 closer together. Clamping forces of the flywheel surface 47 of the clutch sprocket 51, friction disc 43, and pressure plate 48 force the clutch assembly to "seize," causing rotation of the drive gear 21 in the first direction, which in turn causes rotation of the driven spool gear 22, rotating the spool 31 in a winding direction. Rotation of the clutch sprocket 51 transmits rotational forces through the timing belt 61 or chain to the one-way bearing sprocket 50. The one-way bearing sprocket 50 is retained on a one-way bearing support shaft 53. The one way bearing 44 allows rotation of the drive unit in the first direction.

As the user is cocking the crossbow, the elongated connecting component 61 winds about the spool winding surface 31*d*, moving the string carrier 100 from the un-cocked position of the crossbow to the cocked position of the crossbow. At any time during the cocking procedure the user may cease rotation of the crank handle 80. Stored energy conveyed to the bowstring of the crossbow biases the elongated connecting component 61 to pay out, or pull away from the spool 31. The drive unit biases the drive shaft 24 and clutch assembly to the lock direction of the one-way bearing 44 and the compression nut 45, such that when the crank handle 80 is not rotated, the stored energy forces the drive unit in the direction of pay-out, the clutch assembly remains seized, the one-way bearing 44 locks and the elongated connecting component 61 will not pay out.

The stored energy of the crossbow translated to the bowstring to bias the drive shaft 24 and clutch assembly to the lock direction of the one-way bearing 44 and compression nut 45. When the user initiates the de-cocking of the crossbow, the crank handle 80 is rotated in the second drive direction. As the crank handle 80 is rotated in the second drive direction, the compression nut 45 releases some of the clamping forces of the clutch assembly to allow a controlled and limited rotation of the drive gear 21 in the second drive direction, allowing the spool 31 to payout the elongated connecting component 61. As soon as the crank handle 80 is not rotated, the stored energy forces the drive unit in the direction of pay-out, the clutch assembly again seizes and the elongated connecting component 61 will not pay out.

FIG. 9 illustrates an embodiment where the trigger lever 36 is pivotally retained with the crossbow stock 95, wherein a trigger arm is coupled to a connecting arm which is coupled to a sear (not shown). The trigger lever 36 may be spring loaded to a return position to bias the trigger lever 36 in a first or a second direction. The connecting arm may be spring loaded to bias the connecting arm in a first or a second direction. In a preferred embodiment, the connecting arm may be selectable for a length, to change the length of pull. Alternately, the connecting arm may be of differing lengths, and the user chooses a desired length of connecting arm for the chosen length of pull. Length of pull is the distance from the shoulder-engaging portion of the butt stock and the trigger lever.

The spool 31 may be integrated with the driven spool gear 22 or coupled with the driven spool gear 22. The spool 31 may be supported by a shaft, a shaft and bearings or bushings, or by bearings 20 or bushings. The crossbow cocking assembly 10 may be integrated with the crossbow, or retained in a housing that may be removed from the crossbow.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A crossbow having a cocking assembly consisting of:

a support structure coupled with the crossbow and having a first axis, a second axis offset from the first axis, and a third axis;

a spool rotatable about the first axis, said spool includes a first spool side surface, a spool winding surface and a second surface;

an elongated connecting component having a first end operatively coupled with the spool winding surface, and a second end selectively engageable with a bowstring;

a single spool gear operatively coupled with said spool, rotatable about the first axis;

a first bearing is retained on said first spool side surface;

a second bearing is retained on said second spool side surface;

a drive gear operatively engaged with said single spool gear, and selectively rotatable about the second axis in a first drive gear direction and in a second drive gear direction, opposite the first drive gear direction;

a clutch assembly and a clutch sprocket operably engageable with the drive gear, and selectively rotatable about the second axis only in the first direction; and a one way bearing axial with the third axis, radially and axially coupled to a one-way bearing sprocket, said one-way bearing sprocket and said clutch sprocket are operably coupled by one of a chain or a belt, when the clutch assembly is operatively engaged with the drive gear, the drive gear can only be rotated about the second axis in the first drive gear direction, when the clutch assembly is not operatively engaged with the drive gear, the drive gear can optionally be rotated about the second housing axis in either the first drive gear direction or the second drive gear direction without rotation of said clutch sprocket and said bearing sprocket.

2. A crossbow having a cocking assembly consisting of:

a support structure coupled with the crossbow and having a first axis, a second axis offset from the first axis, and a third axis;

a spool rotatable about the first axis, said spool includes a first spool side surface, a spool winding surface and a second spool side;

an elongated connecting component having a first end operatively coupled with the spool winding surface, and a second end selectively engageable with a bowstring;

a single spool gear operatively coupled with said spool, rotatable about the first axis;

a first bearing is retained on said first spool side surface;

a second bearing is retained on said second spool side surface;

a drive gear operatively engaged with said single spool gear, and selectively rotatable about the second axis in a first drive gear direction and in a second drive gear direction, opposite the first drive gear direction;

a clutch assembly and a clutch sprocket operably engageable with the drive gear, and selectively rotatable about the second axis only in the first direction; and a one way bearing axial the third axis, radially and axially coupled to a one-way bearing sprocket, said one-way bearing sprocket and said clutch sprocket are operably coupled by one of a belt or a chain, when the clutch assembly is operatively engaged with the drive gear, the drive gear can only be rotated about the second axis in the first drive gear direction, when the clutch assembly is not operatively engaged with the drive gear, the drive gear can optionally be rotated about the second housing axis in either the first drive gear direction or the second drive gear direction without rotation of said clutch sprocket and said bearing sprocket, wherein said third axis is located in front of said first axis and said second axis, said clutch assembly is located on a different axis than said one-way bearing.

3. A crossbow having a cocking assembly consisting of:

a support structure coupled with the crossbow and having a first axis, a second axis offset from the first axis, and a third axis;

a spool rotatable about the first axis, said spool includes a first spool side surface, a spool winding surface and a second spool side surface;

an elongated connecting component having a first end operatively coupled with the spool winding surface, and a second end selectively engageable with a bow-string;

a single spool gear operatively coupled with said spool, rotatable about the first axis;

a first bearing is retained on said first spool side surface;

a second bearing is retained on said second spool side surface;

a drive gear operatively engaged with said single spool gear, and selectively rotatable about the second axis in a first drive gear direction and in a second drive gear direction, opposite the first drive gear direction;

a clutch assembly and a clutch sprocket operably engage-able with the drive gear, and selectively rotatable about the second axis only in the first direction; and a one way bearing axial the third axis, radially and axially coupled to a one-way bearing sprocket, said one-way bearing sprocket and said clutch sprocket are operably coupled by one of a belt or a chain, when the clutch assembly is operatively engaged with the drive gear, the drive gear can only be rotated about the second axis in the first drive gear direction, when the clutch assem-bly is not operatively engaged with the drive gear, the drive gear can optionally be rotated about the second housing axis in either the first drive gear direction or the second drive gear direction without rotation of said clutch sprocket and said bearing sprocket, said clutch assembly is located on a different axis than said one-way bearing.

* * * * *